United States Patent
Chockler et al.

(10) Patent No.: US 9,389,984 B2
(45) Date of Patent: Jul. 12, 2016

(54) DIRECTING VERIFICATION TOWARDS BUG-PRONE PORTIONS

(71) Applicant: International Business Machines Corporation, Armonk, NY (US)

(72) Inventors: Hana Chockler, Haifa (IL); Oded Margalit, Ramat Gan (IL); Dmitry Pidan, Netanya (IL); Sitvanit Ruah, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 14/022,232

(22) Filed: Sep. 10, 2013

(65) Prior Publication Data

US 2015/0074651 A1   Mar. 12, 2015

(51) Int. Cl.
*G06F 9/44* (2006.01)
*G06F 11/36* (2006.01)

(52) U.S. Cl.
CPC ........ G06F 11/3616 (2013.01); G06F 11/3688 (2013.01); *G06F 11/3676* (2013.01)

(58) Field of Classification Search
CPC ..... G06F 11/36; G06F 17/27; G06F 11/3616; G06F 11/3676; G06F 11/3688
See application file for complete search history.

(56) References Cited

U.S. PATENT DOCUMENTS

| | | | |
|---|---|---|---|
| 6,385,741 B1 * | 5/2002 | Nakamura | 714/38.1 |
| 6,658,643 B1 * | 12/2003 | Bera | G06F 11/3616 714/E11.22 |
| 7,302,677 B2 | 11/2007 | Reissman et al. | |
| 7,900,193 B1 | 3/2011 | Kolawa et al. | |
| 7,962,901 B2 | 6/2011 | McCamant et al. | |
| 8,209,667 B2 * | 6/2012 | Eisner | G06F 9/44589 714/38.1 |
| 8,402,440 B2 | 3/2013 | Sankaranarayanan et al. | |
| 8,453,106 B2 * | 5/2013 | Deline et al. | 717/104 |
| 8,468,499 B2 * | 6/2013 | Dhurjati | G06F 11/3676 717/124 |
| 8,782,606 B1 * | 7/2014 | Cohen et al. | 717/124 |
| 2004/0117771 A1 * | 6/2004 | Venkatapathy | 717/130 |

(Continued)

FOREIGN PATENT DOCUMENTS

WO    2012013509    2/2012

OTHER PUBLICATIONS

Karla Saur et al, "Fourth Workshop on Hot Topics in Software Upgrades (HotSWUp 2012)", [Online], 2012, pp. 55-62, [Retrieved from Interneton on May 5, 2015], <http://delivery.acm.org/10.1145/2440000/2433152/p55-saur.pdf>.*

(Continued)

*Primary Examiner* — Thuy Dao
*Assistant Examiner* — Ziaul A Chowdhury
(74) *Attorney, Agent, or Firm* — Ziv Glazberg

(57) ABSTRACT

A method, system and product for directing verification towards bug-prone portions. The method comprising syntactically analyzing a computer program to identify portions of the computer program that correspond to one or more bug patterns; and performing verification of the computer program, wherein the verification comprises traversing a control flow graph of the computer program and tracking symbolic values of variables of the computer program, wherein said performing comprises directing the traversal of the control flow graph to nodes of the control flow graph that correspond to the identified portions, whereby bug-prone portions of the computer program are prioritized to be verified before non-bug-prone portions of the computer program.

13 Claims, 3 Drawing Sheets

(56) References Cited

U.S. PATENT DOCUMENTS

| | | | | |
|---|---|---|---|---|
| 2005/0015675 | A1* | 1/2005 | Kolawa | G06F 11/3688 714/38.14 |
| 2006/0070048 | A1* | 3/2006 | Li | G06F 11/3676 717/144 |
| 2007/0089092 | A1* | 4/2007 | Schmidt et al. | 717/126 |
| 2007/0168988 | A1* | 7/2007 | Eisner et al. | 717/126 |
| 2007/0180430 | A1* | 8/2007 | Farchi et al. | 717/126 |
| 2008/0256392 | A1* | 10/2008 | Garland et al. | 714/33 |
| 2008/0276228 | A1 | 11/2008 | Sreedhar | |
| 2009/0319833 | A1* | 12/2009 | Nir-Buchbinder | G06F 11/3676 714/38.14 |
| 2010/0333069 | A1* | 12/2010 | Chandra et al. | 717/126 |
| 2011/0022551 | A1* | 1/2011 | Dixon | G06F 11/3616 706/12 |
| 2011/0138362 | A1* | 6/2011 | Keidar-Barner et al. | 717/126 |
| 2011/0314450 | A1* | 12/2011 | Shochat | G06Q 10/06 717/124 |
| 2012/0036135 | A1* | 2/2012 | Fu et al. | 707/748 |
| 2012/0233599 | A1 | 9/2012 | Valdiviezo Basauri et al. | |
| 2013/0013244 | A1* | 1/2013 | Kristiansen et al. | 702/108 |
| 2013/0031423 | A1* | 1/2013 | Barrow | G06F 8/77 714/47.2 |
| 2013/0179863 | A1* | 7/2013 | Vangala et al. | 717/124 |
| 2014/0033174 | A1* | 1/2014 | Farchi | G06F 11/3676 717/124 |
| 2014/0258784 | A1* | 9/2014 | Tepus | G06F 11/3688 714/38.1 |
| 2014/0304685 | A1* | 10/2014 | Xie et al. | 717/124 |

OTHER PUBLICATIONS

Koushik Sen et al., "CUTE: A Concolic Unit Testing Engine for C", [Online], 2005, pp. 1-13, [Retrieved from Interent on May 6, 2015], <http://www.dtic.mil/dtic/tr/fulltext/u2/a483094.pdf>.*

Zhi Da Luo et al., "Effective Static Analysis to Find Concurrency Bugs in Java", [Online], 2010, pp. 134-144, [Retrieved from Internet on Mar. 15, 2016], <http://ieeexplore.ieee.org/stamp/stamp.jsp?tp=&arnumber=5601820>.*

Shin Hong et al. "Effective Pattern-driven Concurrency Bug Detection for Operating Systems", [Online], 2011, pp. 1-28, [Retrieved from Internet on Mar. 15, 2016], <http://swtv.kaist.ac.kr/publications/cobet.pdf>.*

Diomidis Spinellis et al., "A framework for the static verification of API calls", [Online], Elsevier 2006, pp. 1156-1168, [Retrieved from Interneton Mar. 15, 2016], <http://ac.els-cdn.com/S0164121206002755/1-s2.0-S0164121206002755-main.pdf>.*

Nick Rutar et al., "A Comparison of Bug Finding Tools for Java", [Online], IEEE 2004, pp. 1-12, [Retrieved from Internet on Mar. 15, 2016], <http://ieeexplore.ieee.org/stamp/stamp.jsp?tp=&arnumber=1383122>.*

Martin Wehrle, "Transition-Based Directed Model Checking", Dissertation for a Doctorate Degree, University of Albert Ludwig, 2011.

Chockler et al., "Verification of Software Changes With ExpliSAT", Fourth Workshop on Hot Topics in Software Upgrades (HotSWUp), 2012, pp. 31-35.

Jalil et al., "An Empirical Analysis of Defect Prone Design Pattern", IJCSI International Journal of Computer Science Issues, vol. 9, Issue 3, No. 2, May 2012.

Jiang et al., "Context-Aware Statistical Debugging: From Bug Predictors to Faulty Control Flow Paths", ASE '07 Proceedings of the twenty-second IEEE/ACM international conference on Automated software engineering, 2007, pp. 184-193.

Wehrle et al., "Context-Enhanced Directed Model Checking", SPIN'10 Proceedings of the 17th international SPIN conference on Model checking software, 2010, pp. 88-105.

* cited by examiner

DIRECTING VERIFICATION TOWARDS BUG-PRONE PORTIONS

TECHNICAL FIELD

The present disclosure relates to verification in general, and to bug detection, in particular.

BACKGROUND

Various methods and tools are known in the art for performing verification of computer programs. Some methods and tools use model checking, which defines a model of the program and verifies specification properties with respect to the model. Some methods and tools include test the program by executing it, such as using symbolic execution.

Concolic verification tools are tools which use a combination of both concrete values and symbolic values. One example of a concolic verification tool is a concolic testing tool such as described in Godefroid, P., et al., DART: Directed Automated Random Testing, Proceeding of the 2005 ACM SIGPLAN Conference on Programming Language Design and Implementation, 2005, pp. 213-223, which is hereby incorporated by reference in its entirety. Another example of a concolic verification tool is a concolic model checker such as described in U.S. Pat. No. 8,209,667 entitled "Software verification using hybrid explicit and symbolic model checking" for Eisner et al, which is hereby incorporated by reference in its entirety.

BRIEF SUMMARY

One exemplary embodiment of the disclosed subject matter is a computer-implemented method comprising: syntactically analyzing a computer program to identify portions of the computer program that correspond to one or more bug patterns; performing, by a processor, verification of the computer program, wherein the verification comprises traversing a control flow graph of the computer program and tracking symbolic values of variables of the computer program, wherein said performing comprises directing the traversal of the control flow graph to nodes of the control flow graph that correspond to the identified portions, whereby bug-prone portions of the computer program are prioritized to be verified before non-bug-prone portions of the computer program.

Another exemplary embodiment of the disclosed subject matter is a computerized apparatus having a processor, the processor being adapted to perform the steps of: syntactically analyzing a computer program to identify portions of the computer program that correspond to one or more bug patterns; performing verification of the computer program, wherein the verification comprises traversing a control flow graph of the computer program and tracking symbolic values of variables of the computer program, wherein said performing comprises directing the traversal of the control flow graph to nodes of the control flow graph that correspond to the identified portions, whereby bug-prone portions of the computer program are prioritized to be verified before non-bug-prone portions of the computer program.

Yet another exemplary embodiment of the disclosed subject matter is a computer program product comprising a non-transitory computer readable medium retaining program instructions, which instructions when read by a processor, cause the processor to perform a method comprising: syntactically analyzing a computer program to identify portions of the computer program that correspond to one or more bug patterns; performing verification of the computer program, wherein the verification comprises traversing a control flow graph of the computer program and tracking symbolic values of variables of the computer program, wherein said performing comprises directing the traversal of the control flow graph to nodes of the control flow graph that correspond to the identified portions, whereby bug-prone portions of the computer program are prioritized to be verified before non-bug-prone portions of the computer program.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
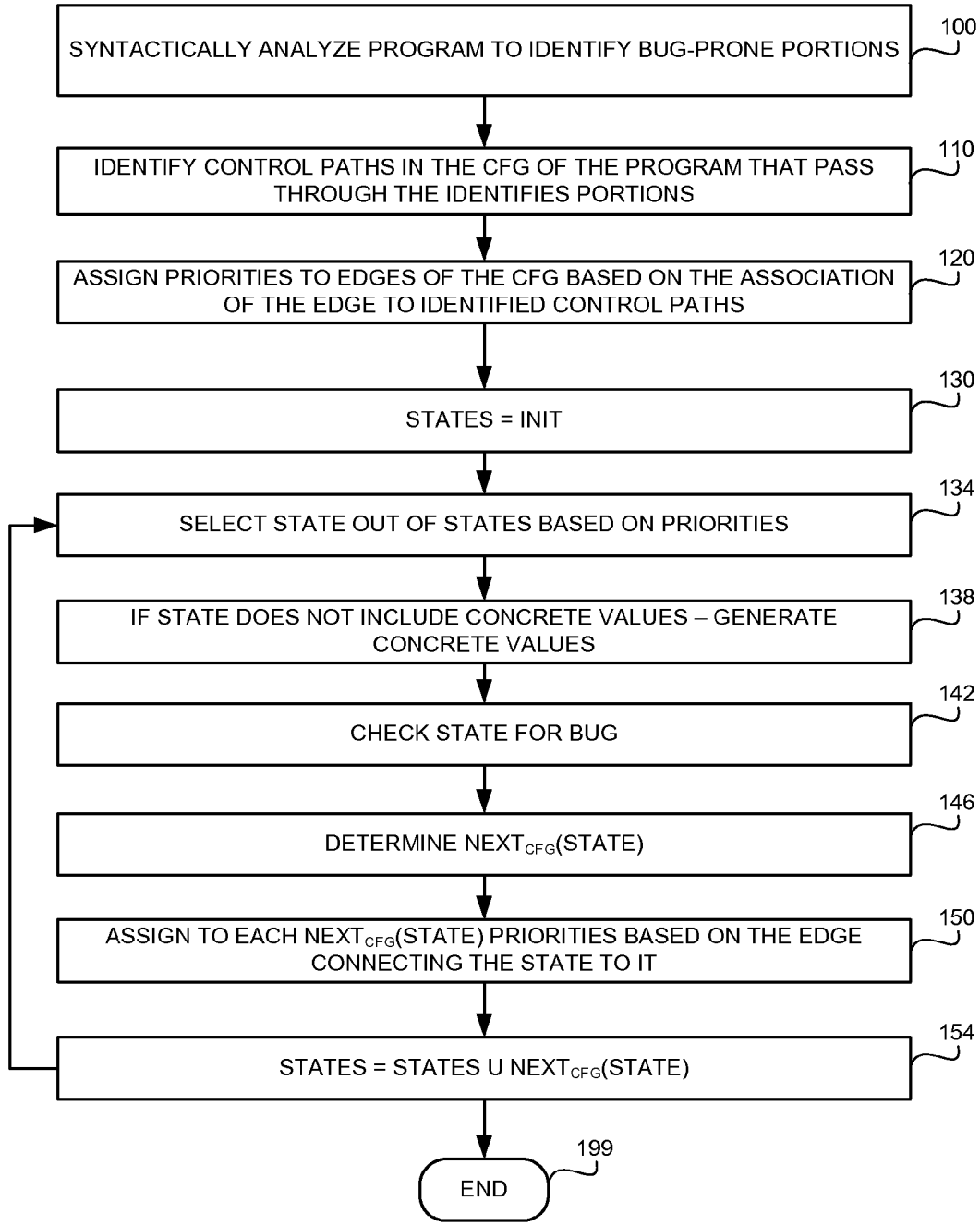
FIG. 1 shows a flowchart diagram of a method, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to guide a verification tool to bug-prone areas of a computer program. Another technical problem is to guide the verification based on a set of bug-patterns.

One technical solution is to syntactically analyze the program in order to mark portions that correspond to bug patterns. In some exemplary embodiments, a Control Flow Graph (CFG) analysis may be performed in order to find all paths that go through the marked lines in the code, thus execution the portion of the program that was identified to correspond to a bug pattern. Based on such an analysis, priorities of edges that participate in such paths may be increased to enforce or stochastically bias traversal order of the CFG so as to traverse control paths that correspond to bug patterns before control paths that do not correspond to such patterns.

One example of a bug pattern may be a "copy-paste code". Often, chunks of code are copy-pasted without making the necessary changes. Syntactic code analysis may find identical chunks of code, then these can be marked, and the control flow paths that go through these identical chunks of code may be traversed first, thus checking for this bug pattern.

Other examples of bug patterns may be places in the source code which were changed many times (one can find such places using a source control system); points in the code with abnormal amount of comments (either too many or too few); usage of functions that are considered error-prone (e.g., scanf function in C, which can cause buffer overflows); etc.

In some exemplary embodiments, traversal of the CFG is performed by a model checker, such as a concolic model checker. Additionally or alternatively, the CFG traversal is performed by a symbolic execution tool or by a concolic execution tool.

In some exemplary embodiments, the CFG traversal is deterministically guided to give preference to edges having higher priorities.

In some exemplary embodiments, the disclosed subject matter may be applied with respect to a model checker, which is configured to check all possible states of a program. The model checker may be, thus, configured to examine the states of the program in an order which increases a probability of finding a bug at an earlier stage of examination. Hence, Referring now to FIG. 1 showing a flowchart diagram of a method, in accordance with some exemplary embodiments of the disclosed subject matter.

In Step 100, a program is syntactically analyzed to identify bug-prone portions. The analysis may be based on syntactic identification of bug-patterns in the code of the program. In some exemplary embodiments, each identified bug-prone portion may be, for example, a function, a statement, a code line, or the like.

In Step 110, a CFG of the program may be analyzed to identify control flow paths in the CFG that pass through the identified portions (e.g., code lines).

In Step 120, priorities may be assigned to edges of the CFG based on the association of the edge to the identified control paths of Step 110. In some exemplary embodiments, the more identified control paths that comprise the edge, the edge may have a higher priority. Additionally or alternatively, priorities may be biased towards edges relating to a larger number of different types of bug-patterns, to a larger number of different instances of bug-patterns, or the like.

In some exemplary embodiments, a verification tool, such as a model checker or a tester, may be directed towards traversing the identified control paths using the priorities of the edges. Additionally or alternatively, the direction may be based on priorities in the nodes of the CFG rather than in the edges, or to combination of both types of priorities.

In some exemplary embodiments, traversal of the CFG may be guided during the traversal, such as in the case of a model checker which does not execute the program and thus need not follow the next state of a previously traversed state. FIG. 1 exemplifies such an embodiment in Steps 130-199. Additionally or alternatively, traversal may be guided by selecting, before execution, a control flow path to traverse. In some embodiments, based on the selection, a path condition may be determined and used to generate input that will guide the execution to the selected path.

In Step 130, a set of states to be traversed is initialized, such as using one or more initial states of the program. The states may define a location in the CFG of the program (e.g., value of an instruction pointer) and symbolic value of variables of the program. Additionally or alternatively, the states may also define a concrete value of the variables in addition to the symbolic value.

In Step 134, a state is selected from the set of states based on the priorities. The selected state may be removed from the set of states. In some exemplary embodiments, the set of states may be a heap, a priority queue or a similar data structure useful for selecting items having higher priorities. In some exemplary embodiments, the selection may be stochastically biased to give preference to states having higher priorities but not guaranteeing such a selection.

In Step 138, if the state does not include concrete values, such values may be generated based on the symbolic value of the variables, as defined in the state. In some exemplary embodiments, the concrete values may be generated using a theorem prover, a Boolean satisfiability problem (SAT) solver, a Constraint Satisfaction Problem (CSP) solver, or the like, which may be used to determine a concrete value that would satisfy the symbolic value and optionally a path condition of the state. The path condition may indicate a constraint over the variables of the program that only if held, the execution follows a specific control flow path. Each state may include a path condition based on the control flow path that was traversed from the init state until the state.

In Step 142, the state may be checked for a bug, such as a violation of a specification property.

In Step 146, one or more next states are determined based on the CFG. A next state of a state may be a state that is associated to a node that is reachable via exactly one edge from the node of the CFG of the state. In some exemplary embodiments, a state may have two or more next states in case of a junction in the CFG. The concrete value of the state may dictate a next state, such as in case of a junction that originates from an IF statement. In such a case, the concrete value of the next state may be defined based on the concrete value of the state. However, the concrete value of the alternative next states may not be known (and thus may be generated in Step 138 once such a state is selected). Additionally or alternatively, the selection between the junctions may be non-deterministic, such as in case of a junction that is due to concurrency.

In Step 150, each next state is assigned a priority based on the priority of the edge connecting the node of the previous state to the node of the next state.

In Step 154, the computed next states are added to the set of states. In some exemplary embodiments, states are only added if they were not previously traversed. Such a determination may be performed using a history mechanism of the traversed states.

If the set of states is not empty, step 134 may be performed. Otherwise, the method may end in Step 199 as the traversal of the CFG is completed.

Figure 2:
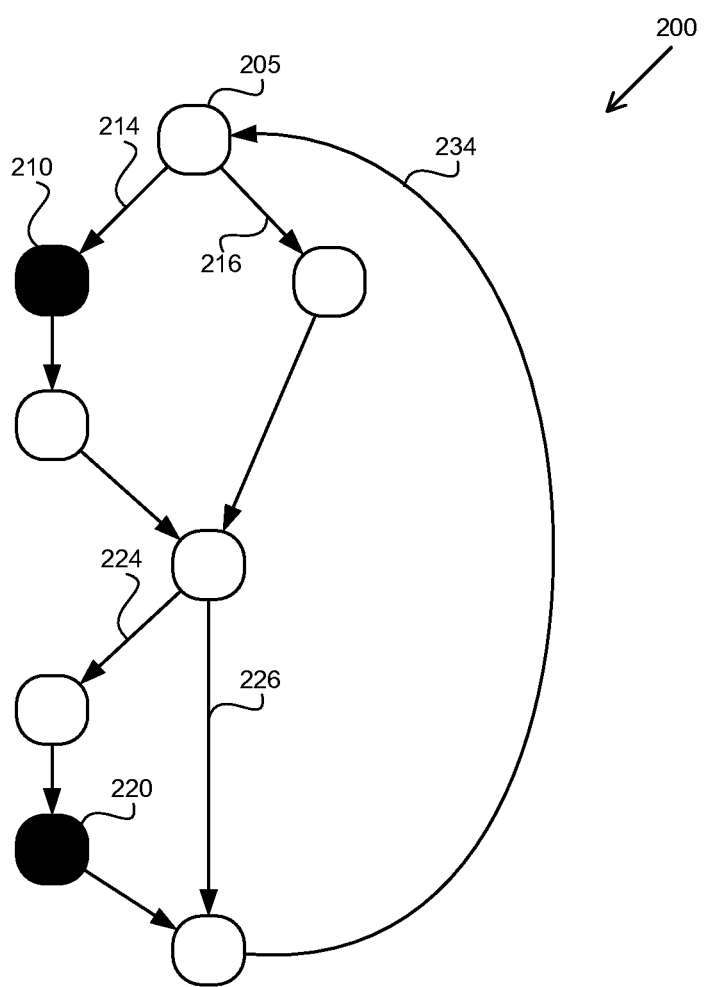
FIG. 2 shows an illustration of a control flow graph, in accordance with some exemplary embodiments of the disclosed subject matter.

Referring now to FIG. 2 showing an illustration of a control flow graph, in accordance with some exemplary embodiments of the disclosed subject matter.

CFG 200 is a directed graph of nodes and edges. Each node is associated with an element of the program, such as a statement, a code line, a function, or the like. An edge from a first node to a second node indicates that there exists a situation in which the program would move from the first element to the second element, such as a next statement of the current statement, a target statement of a branching statement, or the like.

Nodes 210 and 220 are deemed as associated with a bug-pattern, such as based on a syntactic analysis of the program.

Based on a syntactic analysis of the program, CFG 200 may be constructed having an Initial Node 205.

In some exemplary embodiments, a priority of Edge 214 may be higher than of Edge 216 as Edge 214 is on the control flow path which leads to Node 210. Similarly, the priority of Edge 224 may be higher than of Edge 226 in view of Node 220. In some exemplary embodiments, the priorities of the edges may be assigned based on an analysis of the CFG.

In some exemplary embodiments, Edge 216 may be assigned higher priority than Edge 226, as Edge 216 is included in more control flow paths that include a bug-prone area than Edge 226 (e.g., as Edge 216 may lead to reaching Node 220).

In some exemplary embodiments, bug-prone areas may be considered as being bug-prone only if several elements are reached. This may be the case, for example, with certain bug patterns that require several steps within the pattern. In such a case, a path that reaches Node 220 from via Edge 216 and without reaching Node 210 may not be considered as a control path that includes the bug-prone area.

In some exemplary embodiments, priorities may be assigned based on a Directed Acyclic Graph (DAG) constructed based on the CFG 200. The DAG may comprise all edges and nodes of CFG 200 except for Edge 234 which introduces a cycle in the CFG 200. The analysis of the priorities to the edges may be based on the DAG. In some exemplary embodiments, the DAG may include an unrolling of one or more loop iterations, such as by creating different copies of nodes and edges for each iteration of the loop.

Figure 3:
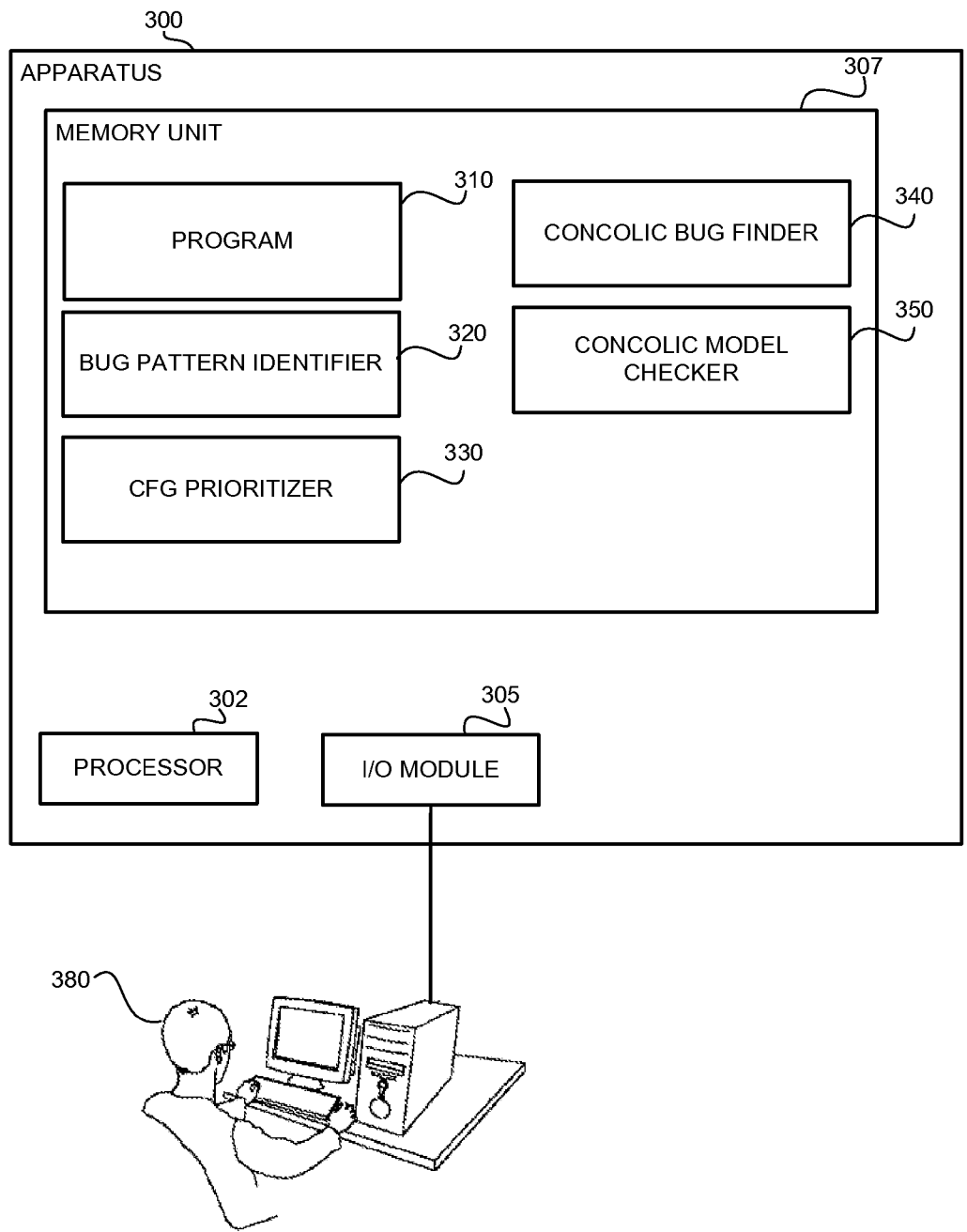
FIG. 3 shows a block diagram of an apparatus, in accordance with some exemplary embodiments of the disclosed subject matter.

Referring now to FIG. 3 showing a block diagram of components of an apparatus, in accordance with some exemplary embodiments of the disclosed subject matter. An apparatus 300 may be a computerized apparatus adapted to perform methods such as depicted in FIG. 1.

In some exemplary embodiments, Apparatus 300 may comprise a Processor 302. Processor 302 may be a Central Processing Unit (CPU), a microprocessor, an electronic circuit, an Integrated Circuit (IC) or the like. Alternatively, Apparatus 300 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 302 may be utilized to perform computations required by Apparatus 300 or any of it subcomponents.

In some exemplary embodiments of the disclosed subject matter, Apparatus 300 may comprise an Input/Output (I/O) Module 305 such as a terminal, a display, a keyboard, an input device or the like to interact with the system, to invoke the system and to receive results. It will however be appreciated that the system can operate without human operation.

In some exemplary embodiments, the I/O Module 305 may be utilized to provide an interface to a User 380 to interact with Apparatus 300, such as to provide the detected bugs to User 380.

In some exemplary embodiments, Apparatus 300 may comprise a Memory Unit 307. Memory Unit 307 may be persistent or volatile. For example, Memory Unit 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory Unit 307 may retain program code operative to cause Processor 302 to perform acts associated with any of the steps shown in FIG. 1.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A Program 310 may be the program being verified. In some exemplary embodiments, a code of Program 310 may be provided.

A Bug Pattern Identifier 320 may be configured to analyze Program 310 to detect bug-prone areas. Bug Pattern Identifier 310 may be configured to syntactically analyze Program 310. Additionally or alternatively, other static analysis methods may be applied to analyze Program 310.

It will be noted that a bug-prone area may not actually induce a bug. In some cases, false positive indications may be determined by Bug Pattern Identifier 320. However, in some exemplary embodiments no false positive indication are provided to the user, as a bug is reported based on an identification of a counter-example by Concolic Model Checker 320 or by a falsifying execution found by Concolic Bug Finder 340.

Based on the identified bug-prone portions of Program 310, a CFG Prioritizer 330 may prioritize CFG traversal. CFG Prioritizer 330 may define priorities to control flow paths, the edges, or the like, in order to guide traversal to give preference to control flow paths that are associated with bug patterns or with identified bug-prone areas.

In some exemplary embodiments, verification may be performed by a verification tool such as Concolic Bug Finder 340 or Concolic Model Checker 350. Non concolic verification tool may also be used.

In some exemplary embodiments, the model checker may traverse the CFG so as to give preference to edges having higher priorities. In some exemplary embodiments, the preference may be implemented using stochastic decisions.

In some exemplary embodiments, the bug finder may be guided by selecting a control flow path to traverse, determining input that will guide the execution along the selected control flow path (e.g., variables that relate to the path condition, synchronization decisions relating to concurrent execution, or the like).

In some exemplary embodiments, Concolic Bug Finder 340 or Concolic Model Checker 350 may be configured to utilize a SAT solver, a CSP Sover, a theorem prover, or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    syntactically analyzing a computer program to identify bug-prone portions of the computer program that correspond to one or more bug patterns, wherein the identified bug-prone portions are suspected of including a bug, wherein the identified bug-prone portions either include a bug or do not include a bug;
    performing, by a processor, verification of the computer program, wherein the verification comprises traversing a control flow graph of the computer program and tracking symbolic values of variables of the computer program, wherein said performing comprises directing the traversal of the control flow graph to nodes of the control flow graph that correspond to the identified bug-prone portions, wherein an edge associated with a larger number of control flow paths of the control flow graph which correspond to the one or more bug patterns is assigned a higher priority than another edge associated with a smaller number of control flow path which corresponds to the one or more bug patterns; and
    whereby the bug-prone portions of the computer program, which were identified during said syntactically analyzing, are prioritized to be verified
before non-bug-prone portions of the computer program, which were not identified as bug-prone during said syntactically analyzing.

2. The computer-implemented method of claim 1 further comprising assigning priorities to edges of the control flow graph based on correspondence to the identified portions; and wherein said traversing the control flow graph is performed based on the priorities, whereby the traversal is directed to the nodes of the control flow graph that correspond to the identified portions.

3. The computer-implemented method of claim 2, wherein the traversal is performed non-deterministically with a stochastic biasing towards edges having higher priorities, whereby the traversal is stochastically directed to the nodes.

4. The computer-implemented method of claim 1, wherein said verification is model checking, wherein the model checking traverses the control flow graph while tracking symbolic values of variables of the program.

5. The computer-implemented method of claim 1, wherein said model checking is concolic model checking, wherein the concolic model checking tracks concrete values of the variables of the program.

6. The computer-implemented method of claim 1, wherein said verification is selected from the group consisting of: symbolic execution and concolic execution.

7. A computerized apparatus having a processor, the processor being adapted to perform the steps of:
   syntactically analyzing a computer program to identify bug-prone portions of the computer program that correspond to one or more bug patterns, wherein the identified bug-prone portions are suspected of including a bug, wherein the identified bug-prone portions either include a bug or do not include a bug;
   performing verification of the computer program, wherein the verification comprises traversing a control flow graph of the computer program and tracking symbolic values of variables of the computer program, wherein said performing comprises directing the traversal of the control flow graph to nodes of the control flow graph that correspond to the identified bug-prone portions, wherein an edge associated with a larger number of control flow paths of the control flow graph which correspond to the one or more bug patterns is assigned a higher priority than another edge associated with a smaller number of control flow path which corresponds to the one or more bug patterns; and
   whereby the bug-prone portions of the computer program, which were identified during said syntactically analyzing, are prioritized to be verified before non-bug-prone portions of the computer program, which were not identified as bug-prone during said syntactically analyzing.

8. The computerized apparatus of claim 7, wherein the processor further adapted to perform: assigning priorities to edges of the control flow graph based on correspondence to the identified portions; and wherein said traversing the control flow graph is performed based on the priorities, whereby the traversal is directed to the nodes of the control flow graph that correspond to the identified portions.

9. The computerized apparatus of claim 8, wherein the traversal is performed non-deterministically with a stochastic biasing towards edges having higher priorities, whereby the traversal is stochastically directed to the nodes.

10. The computerized apparatus of claim 7, wherein said verification is performed by a model checker, wherein the model checker is configured to traverse the control flow graph while tracking symbolic values of variables of the program.

11. The computerized apparatus of claim 10, wherein said model checker is a concolic model checker, wherein the concolic model checker is configured to track concrete values of the variables of the program.

12. The computerized apparatus of claim 7, wherein said verification is selected from the group consisting of: symbolic execution and concolic execution.

13. A computer program product comprising a non-transitory computer readable medium retaining program instructions, which instructions when read by a processor, cause the processor to perform a method comprising:
   syntactically analyzing a computer program to identify bug-prone portions of the computer program that correspond to one or more bug patterns, wherein the identified bug-prone portions are suspected of including a bug, wherein the identified bug-prone portions either include a bug or do not include a bug;
   performing verification of the computer program, wherein the verification comprises traversing a control flow graph of the computer program and tracking symbolic values of variables of the computer program, wherein said performing comprises directing the traversal of the control flow graph to nodes of the control flow graph that correspond to the identified bug-prone portions, wherein an edge associated with a larger number of control flow paths of the control flow graph which correspond to the one or more bug patterns is assigned a higher priority than another edge associated with a smaller number of control flow path which corresponds to the one or more bug patterns; and
   whereby the bug-prone portions of the computer program, which were syntactically analyzing, are prioritized to be verified before non-bug-prone portions of the computer program, which were not identified as bug-prone during said syntactically analyzing.

* * * * *